Feb. 9, 1971  R. E. SCHUIL  3,562,174
METHOD OF PREPARING A LANTHAMIDE ACTIVATED
YTTRIUM, GADOLINIUM, OR LANTHANUM
OXYSULFIDE LUMINESCENT MATERIAL
Filed March 29, 1968
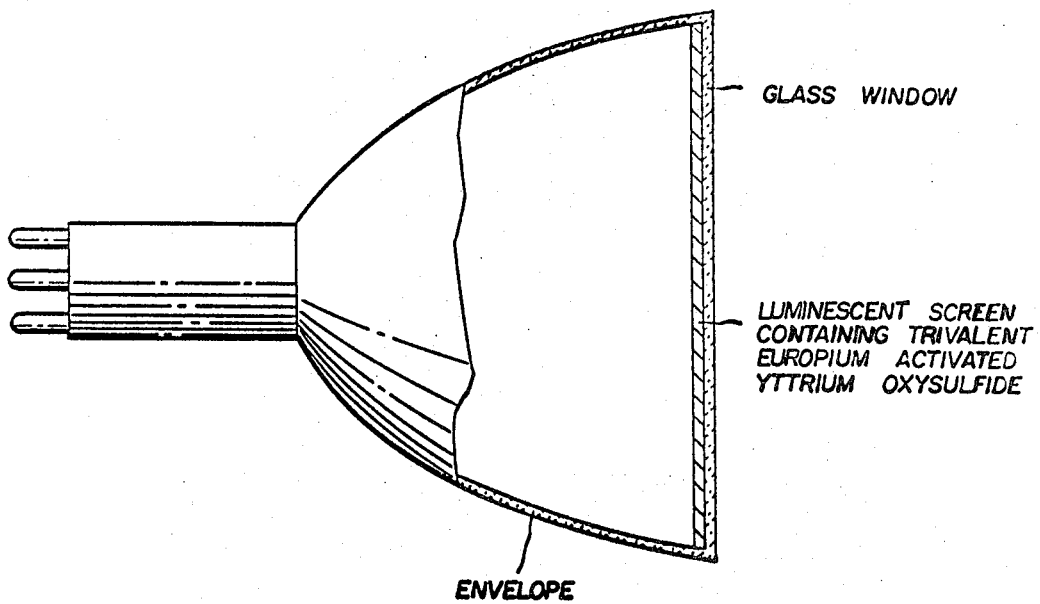
INVENTOR.
ROELOF E. SCHUIL
BY
AGENT

United States Patent Office 3,562,174
Patented Feb. 9, 1971

3,562,174
METHOD OF PREPARING A LANTHAMIDE ACTIVATED YTTRIUM, GADOLINIUM, OR LANTHANUM OXYSULFIDE LUMINESCENT MATERIAL
Roelof Egbert Schuil, Emmasingel, Eindhoven, Netherlands, assignor, by mesne assignments, to U.S. Philips Corporation, New York, N.Y., a corporation of Delaware
Filed Mar. 29, 1968, Ser. No. 717,243
Claims priority, application Netherlands, Mar. 31, 1967, 6704591
Int. Cl. C09k 1/14
U.S. Cl. 252—301.4      5 Claims

ABSTRACT OF THE DISCLOSURE

Prepare europium activated yttrium or lanthanum oxysulfide by heating europium oxide and yttrium oxide and lanthanum oxide in a melt of sodium or potassium thiocyanate.

---

The invention relates to a method of preparing a luminescent material, which may be denoted by the general name of oxysulphide, and to a luminescent material prepared by such a method; the invention further relates to a cathode-ray tube comprising a picture screen containing a material prepared in such manner.

In the Dutch patent applications 6603803, and 6603804 laid open to public inspection on Sept. 26, 1966, luminescent substances are described which may be represented by the general formula $M'_{(2-x)}M''_xO_2S$, where $M'$ is inter alia one of the elements yttrium, gadolinium or lanthanum and $M''$ is at least one member of the group of the lanthanide elements. In this formula $x$ is a number smaller than 0.2 and larger than 0.0002. In the luminescent substances which are represented by the said formula, the element denoted by $M''$ fulfils the role of activator. The substances may be excited both by ultraviolet radiation and by electrons and then show a different emission according to the activator. For example, with the element terbium as the activator a blue or green emission is obtained and with the element europium or samarium a red emission is obtained.

In particular the compounds with the element europium as the activator are of importance because substances activated with this element in trivalent form give a very strong red emission in that part of the spectrum which is particularly desirable in the light to be emitted by the picture screen of a cathode ray tube which is used for colour television reproduction purposes.

In the above mentioned published Dutch patent applications a few methods are described of preparing the above mentioned oxysulphides. All these methods describe the heating of a mixture of two compounds of the elements $M'$ and $M''$, respectively, at a high temperature at which a reaction occurs between the two solids. If the combined compounds of the elements $M'$ and $M''$ contain no sulphur, for example, in case oxalates or oxides of $M'$ and $M''$ are used, the heating for the forming reaction of the ultimate luminescent material must take place in a sulphurating atmosphere. As such may be used a hydrogen sulphide atmosphere or an atmosphere of carbon sulphide. In the detailed description of examples of the two Dutch patent applications, heating in a hydrogen sulphide atmosphere is always described.

Although with the known methods according to the Dutch patent applications, good luminescent substances can be obtained, very great drawbacks are involved. One of the most important drawbacks is that a reaction must take place between two solids at high temperature. As is known, such a reaction is very difficult to realize and requires all kinds of precautions. For example, a very thorough degree of mixing should be ensured and the heating must usually be continued for a long period of time so as to obtain a proper efficiency of conversion. Another drawback is that the calculation of the correct quantities of substances to be mixed presents difficulties. Actually it is not sure that the ratio which is desired in the final product between the various elements is also obtained if the same ratio is chosen in the starting mixture of substances to be heated.

Heating in an atmosphere of hydrogen sulphide or carbon sulphide is a particularly great drawback. In fact, both these substances are poisonous and in addition have very unpleasant odors. Thus when these substances are employed all kinds of measures are necessary for the safety, health and comfort of the workers who have to use them.

In the literature other methods are described for forming oxysulphides of rare earth elements; in these methods there are always employed poisonous or unpleasant smelling compounds.

A method according to the invention for preparing a luminescent material having a composition which satisfies the formula $M'_{(2-x)}M''_xO_2S$, where $M'$ is at least one member of the group consisting of the elements yttrium, gadolinium and lanthanum, $M''$ is at least one member of the group of the lanthanide elements having an atomic number between 57 and 64 and between 64 and 71, and $x$ is a number smaller than 0.2 and larger than 0.0002, is characterized in that a quantity of thiocyanate of at least one of the elements sodium and potassium is melted, the melt is then heated until a temperature between 300° and 700° C. is reached, the quantity of the oxides of the elements $M'$ and $M''$ required for the formation of the luminescent substance with the desired composition is then dissolved in the melt, the melt is then kept at a temperature between 200° and 700° C. for at least two minutes and finally cooled to room temperature.

During the heating of the thiocyanate to a temperature between 300° and 700° C. a strong blue colouring occurs. After the addition of the oxides of the elements $M'$ and $M''$ a reaction occurs between the rhodanide and the oxides, the oxysulphide of the elements $M'$ and $M''$ being formed. The colour of the melt changes from deep blue to brown to yellow. The general formation reaction may be represented by the equation:

$M'_2O_3 + M''_2O_3 + (K,Na)CNS \rightarrow M'M''O_2S + (K,Na)CNO$

The oxysulphide formed during the reaction is luminescent on being excited by ultraviolet radiation or electrons. It is contained in the melt which is solidified again by the cooling to room temperature. In most cases it will be necessary to remove the formed oxysulphide from the said solidified melt. This can be done particularly simply by leaching with water in which the oxysulphide is highly insoluble and the remaining products of the reaction are very readily soluble.

The thiocyanate is preferably used in a rather large excess and the quantities of oxide introduced into the melt are those just as is desired in the ultimate luminescent product. The excess of thiocyanate is preferably chosen to be not smaller than two times and not larger than ten times the stoichiometric quantity in moles required for the formation of the oxysulfide. A larger excess is not necessary.

The luminescence of the oxysulphide prepared and separated in the above described manner may be considerably improved by heating the material at a temperature of 1100° to 1500° C. in an atmosphere containing no free oxygen for from 15 to 240 minutes. Such an atmosphere may consist, for example, of nitrogen or air from which the free oxygen has been withdrawn by a reaction of oxygen with carbon. This latter atmosphere may be obtained, for example, by placing a quantity of carbon beside the oxysulfide which is provided in a furnace in which the heating is carried out. An atmosphere containing free oxygen is absolutely undesirable since the oxysulfide will decompose to oxide and sulphur dioxide.

As compared with the above described known methods of preparing oxysulfides a method according to the invention has the great advantage that no heating wtih or in poisonous or evil-smelling substances, for example, hydrogen sulphide is necessary. Another important advantage is that the whole reaction is carried out in a homogeneous medium and at a low temperature. As a result of this all the drawbacks associated with solid-state reactions are avoided.

A particularly great advantage is that during the reaction only one luminescent compound is formed namely the desired oxysulphide. In a solid-state reaction in an atmosphere of hydrogen sulphide or with sulphides, there is always the danger present of the formation of sulfides in addition to the desired oxysulphide. The presence of these sulfides is very disturbing, because usually they do not have the desired luminescence and because they are usually strongly coloured and chemically unstable. The oxysulphides themselves also which are obtained on heating in a hydrogen sulphide atmosphere are often coloured. Afterwards they cannot substantially be made white not, more example, by washing with acid either. White luminescence substances, however, are highly desirable for most of the applications.

Another great advantage of a method according to the invention is that the starting product, the thiocyanate of potassium or sodium, is a cheap substance. Although in itself hydrogen sulphide is not an expensive substance it has to be transported in cylinders so that high cost of transportation is unavoidable. If hydrogen sulphide is to be prepared on the spot, a bulky and consequently costly apparatus is required for that purpose.

The efficiency of the formation reaction of the oxysulphides according to the invention is substantially 100%, which naturally is a particularly great advantage.

In use the oxysulfides obtained by using a method according to the invention are absolutely equal to and often better than the substances prepared according to the conventional methods. The resulting luminous efficiencies are at least equally high as in the substances obtained according to the conventional methods.

In order that the invention may be readily carried into effect, it will now be described in greater detail with reference to the following specific example.

EXAMPLE 1

1 kgm. of dry KCNS was melted in a "Pyrex" beaker glass and the melt was heated at 480° C. A mixture of 430 gms. of pure $Y_2O_3$ and 35.2 g. of pure $Su_2O_3$ was added to said melt with stirring. The melt with the oxides dissolved therein was then stirred for 30 minutes and kept at a temperature at 500° to 540° C. The melt was then allowed to cool with stirring until the solidifying set in. Then the stir was removed and the melt was allowed to cool to room temperature. The solidified melt was then leached with water and the solid residue separated, for example, by filtration or decanting, and repeatedly washed with water and dried. The resulting dry white reaction product had a red luminescence on being excited with short wave and long wave ultraviolet radiation and on being excited with electrons. On being excited with electrons, a brightness was measured of 30% of the brightness of red luminescent yttrium vanadate activated with trivalent europium. (This latter substance is a known red luminescent substance which is frequently used in cathode ray tubes for reproducing colour television images.) After the measurements the same substance was heated at a temperature of 1300° C. for 2 hours in air from which the oxygen had been withdrawn by a reaction with carbon. After cooling the product was again excited with electrons under the same circumstances and the brightness was again measured. A value was found which was 120% of the brightness of the above mentioned yttrium vanadate.

The luminescent product had a composition which satisfies the formula:

$$Y_{1.9}Eu_{0.1}^{+++}O_2S$$

EXAMPLE 2

In a manner similar to that described in Example 1, a red luminescent compound was prepared which satisfies the formula $$La_{1.9}Eu_{0.1}^{+++}O_2S$$

The starting material was 1 kgm. of dry KCNS to which, after having been melted and heated to a temperature of 480° C., 310 gms. of $La_2O_3$ and 17.6 gms. of $Eu_2O_3$ were added while stirring. After this the process described in Example 1 was followed.

The measurement of the brightness was carried out exactly as described in Example 1. The non-heated white product showed a brightness of 10% relative to the yttrium vanadate. After the substance had been heated in the same manner as described in Example 1, a brightness of 55% relative to the standard was measured.

EXAMPLE 3

A luminescent material which satisfies the formula $$Y_{1.9}Eu_{0.1}^{+++}O_2S$$

was prepared, in a manner similar to those described in Examples 1 and 2, by starting from 120 gms. of NaCNS and 40 gms. of a mixed oxide of the formula $$Y_{1.9}Eu_{0.1}^{+++}O_3$$

This mixed oxide was obtained by heating a mixture of the correct quantities of yttrium oxalate and europium oxalate at a temperature of 700 to 1000° C. for some time. During this preparation the melt of NaCNS was kept at a temperature of 475° C. for 30 minutes. In the same manner as described in Examples 1 and 2, the red luminescent material was then separated and measured relative to the same standard phosphor. A brightness of 30% was found which could be increased to 125% relative to the standard phosphor by after-firing.

EXAMPLE 4

In a manner similar to those described in Examples 1 and 2, a green luminescent substance which satisfies the formula $$Gd_{1.94}Er_{0.06}^{+++}O_2S$$

can be prepared by starting from 1.3 kgms. of dry KCNS, 351 gms. of $Gd_2O_3$ and 11.4 g. of $Er_2O_3$.

After removing the green luminescing product from the melt, the brightness on excitation by electrons was measured relative to the known green luminescing substance willemite. A brightness of 2% relative to the said substance was found which could be increased to 10% by heating at 1300° C. in a nitrogen atmosphere for 2 hours.

The luminescent substances prepared by a method according to the invention may be provided in known manner in the luminescent screens of lamps or cathode-ray tubes. They present no particular problems relative to corresponding compounds prepared in a different manner. Such a cathode ray tube is shown in the drawing the sole figures of which is a sectional view of a cathode ray tube having an envelope with a glass window and a luminescent screen located on the inside of the window containing a trivalent europium activated yttrium oxysulfide phosphor.

What is claimed is:

1. A method of preparing a luminescent material having a composition of the formula $M'_{(2-x)}M'''_xO_2S$, wherein M' is at least one member of the group consisting of the elements yttrium, gadolinium and lanthanum, M" is at least one member of the group of the lanthanide elements having an atomic number either between 57 and 64 or between 64 and 71, and $x$ is a number smaller than 0.2 and larger than 0.0002, wherein a quantity of a thiocyanate of at least one of the elements sodium and potassium is melted, the resultant melt is then heated until a temperature between 300° and 700° C. is reached, the quantities of the oxides of the elements M' and M'' required for the formation of the luminescent substances with the desired composition are then dissolved in the melt, the melt is then kept at a temperature between 200° C. and 700° C. for at least two minutes and finally cooled to room temperature.

2. The method of claim 1 wherein the thiocyanate is employed in an amount in excess of that required for the formation of the desired compound.

3. The method of claim 2 wherein the thiocyanate is not smaller than 2 times and not larger than 10 times the necessary quantity in moles.

4. The method of claim 2 wherein the melt after being cooled to room temperature and solidified is leached with water to remove all the soluble compounds and separate the insoluble desired oxysulphide.

5. The method of claim 4 wherein the separated oxysulphide is heated in an oxygen-free atmosphere of 15 minutes to 240 minutes at a temperature of 1100° to 1500° C.

References Cited
UNITED STATES PATENTS

| | | | |
|---|---|---|---|
| 3,418,247 | 12/1968 | Yocom | 252—301.4S |
| 3,418,246 | 12/1968 | Royce | 252—301.4S |
| 3,423,621 | 1/1969 | Royce | 252—301.4S |

TOBIAS E. LEVOW, Primary Examiner

R. D. EDMONDS, Assistant Examiner

PO-1050
(5/69)

UNITED STATES PATENT OFFICE
CERTIFICATE OF CORRECTION

Patent No. 3,562,174 (PHN 2395)    Dated    February 9, 1971

Inventor(s) ROELOF EGBERT SCHUIL

It is certified that error appears in the above-identified patent and that said Letters Patent are hereby corrected as shown below:

Column 4, line 73, change "$M'(_{2-x})M'''_xO_2S$" to

-- $M'(_{2-x})M''_xO_2S$ --.

Signed and sealed this 15th day of May 1973.

(SEAL)
Attest:

EDWARD M. FLETCHER, JR.  
Attesting Officer

ROBERT GOTTSCHALK  
Commissioner of Patents